United States Patent [19]
Wang

[11] Patent Number: 5,806,158
[45] Date of Patent: Sep. 15, 1998

[54] METHOD FOR MOUNTING DIAMONDS ON STAINLESS STEEL OBJECTS

[76] Inventor: Jing-Tsang Wang, P.O. Box 90, Tainan City, Taiwan

[21] Appl. No.: 912,234

[22] Filed: Aug. 15, 1997

[51] Int. Cl.$^6$ ....................................................... B23P 5/00
[52] U.S. Cl. ...................................................... 29/10; 63/28
[58] Field of Search .............................. 29/10; 63/26, 27, 63/28

[56] References Cited

U.S. PATENT DOCUMENTS

| | | | |
|---|---|---|---|
| 4,443,919 | 4/1984 | Guida et al. ................................. | 29/10 |
| 4,648,248 | 3/1987 | Raymond ..................................... | 29/10 |
| 4,731,913 | 3/1988 | Plantureux et al. ......................... | 29/10 |
| 5,218,839 | 6/1993 | Udko ........................................... | 63/28 |

*Primary Examiner*—P. W. Echols

[57] ABSTRACT

A method for mounting diamonds in stainless steel objects includes steps of cutting material stainless steel into needed sizes and shapes, of drilling holes for diamonds in objects, of etching small projections on an outer edge of each hole by an electric processing machine, of grinding surfaces of objects attached with small projections by an electrolysis grinding machine, and of mounting diamonds in the objects by means of a diamond mounting machine having a press rod for pressing small projections to bend on sloped faces of diamonds placed in the holes of the objects.

1 Claim, 8 Drawing Sheets

METHOD FOR MOUNTING DIAMONDS ON STAINLESS STEEL OBJECTS

BACKGROUND OF THE INVENTION

This invention relates to a method for mounting diamonds on stainless steel objects, particularly one using a CNC (computer numerical control) projecting machine and an electric processing machine for cutting material stainless steel, drilling, etching electrically, grinding surfaces by electrolysis and mounting diamonds with a mounting machine, saving labor and time more effectively than conventional manual mounting work.

At present, conventional methods for mounting diamonds are rather suitable for objects made of K gold, copper, hardly usable for objects made of platinum or stainless steel. Objects made of stainless steel are difficult to process owing to its hardness, especially minute work of mounting diamonds on them.

SUMMARY OF THE INVENTION

The purpose of the invention is to offer a method for mounting diamonds on stainless steel objects, enhancing producing effect to save labor and time.

A feature of the invention is a CNC processing machine for drilling precisely holes for diamonds in objects made of stainless steel.

Another feature of the invention is a CNC electric processing machine for etching small projections on an outer edge of each hole.

Another feature of the invention is an electrolysis grinding machine for grinding surfaces of objects.

One more feature of the invention is a diamond mounting machine having a press rod for pressing the small projections to bend on sloped faces of a diamond for locking it in each hole of an object.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
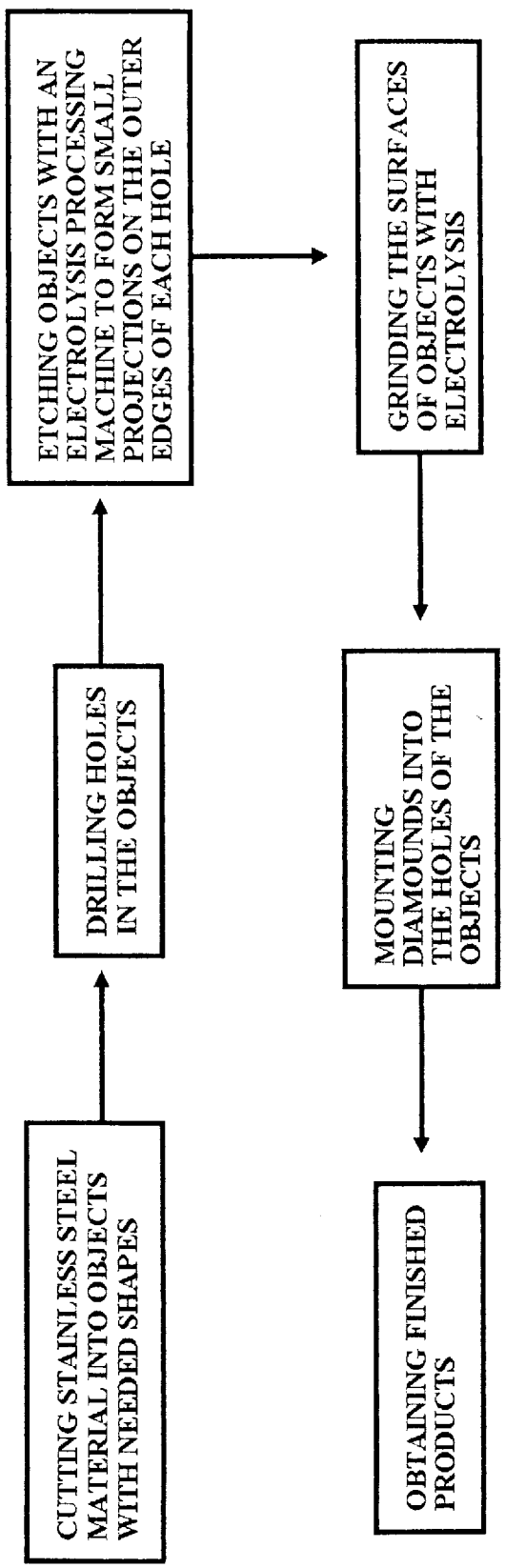
FIG. 1 is a block diagram showing a method for mounting diamonds on stainless steel objects in the present invention.

A preferred embodiment of a method for mounting diamonds on objects in the present invention, as shown in FIG. 1, includes the following steps.

Figure 2E:
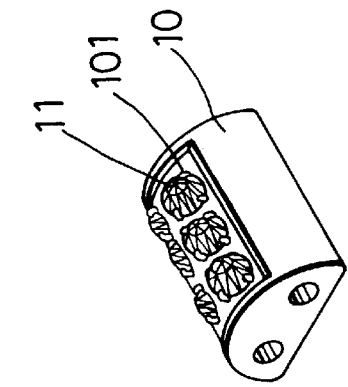
FIG. 2E is a perspective view showing diamonds being immovablly locked in the holes of the objects in the present invention.
Figure 2D:
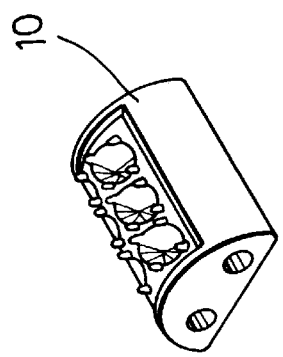
FIG. 2D is a perspective view showing the surface of the object being ground smooth by means of electrolysis grinding in the present invention.
Figure 2C:
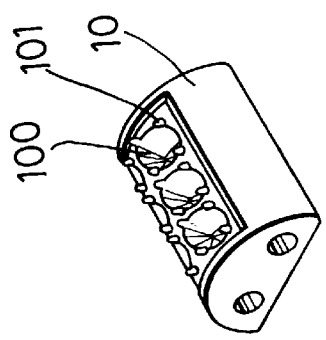
FIG. 2C is a perspective view showing the object etched with an electrolysis processing machine and formed with small projections on the outer edges of the plurality of holes in the present invention.
Figure 2B:
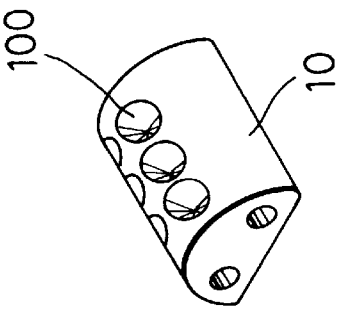
FIG. 2B is a perspective view showing an object having a plurality of holes being drilled in the object in the present invention.
Figure 2A:
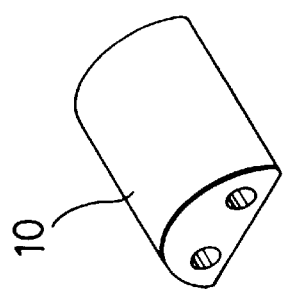
FIG. 2A is a perspective view showing a stainless steel material being cut into objects with needed shapes in the present invention.

1. Cutting material stainless steel into objects:

First, material stainless steel is cut into objects with needed shapes such as rings for a watch band as shown in FIG. 2A.

Figure 3:
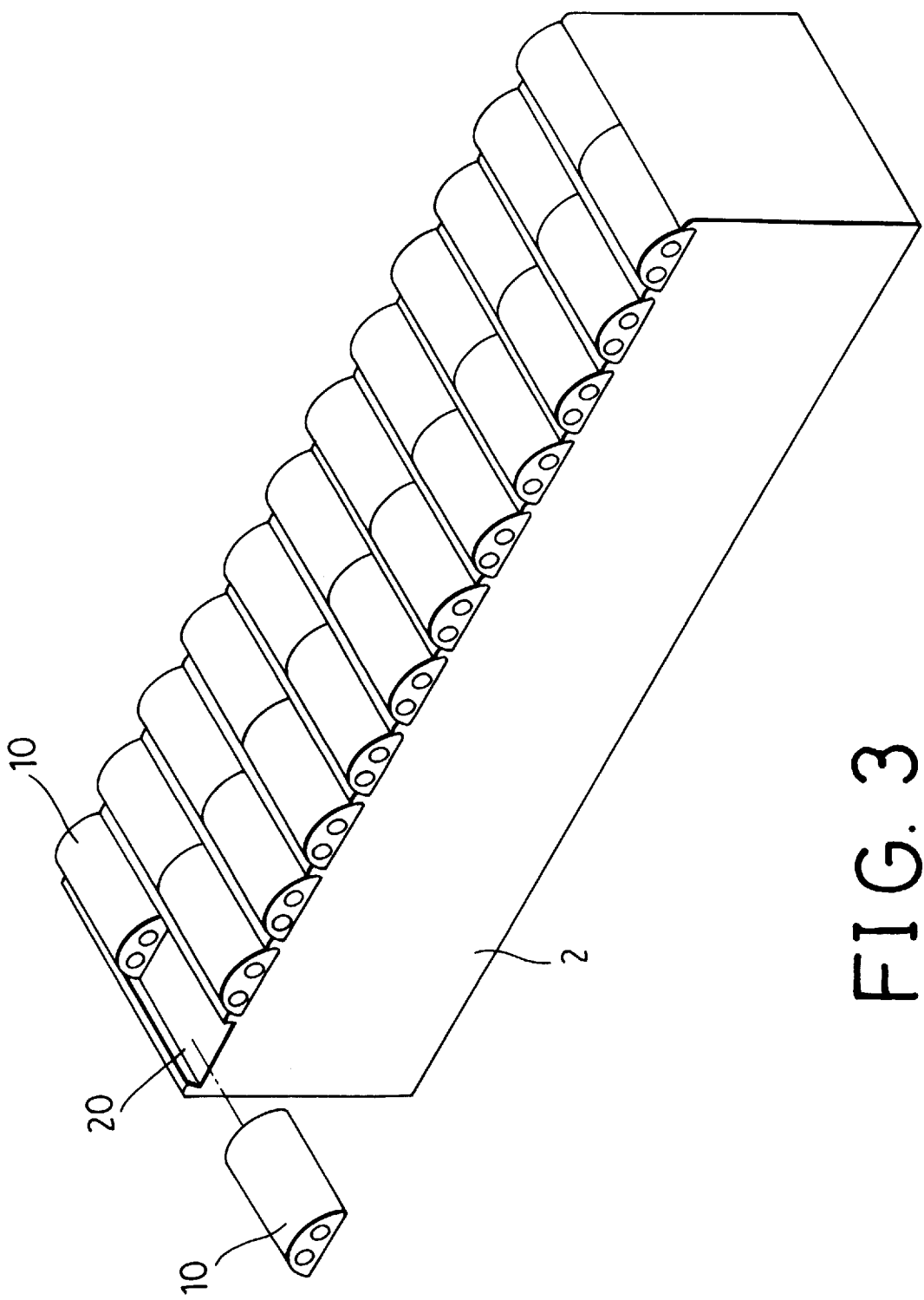
FIG. 3 is a perspective view showing a vice in the present invention.
Figure 4:
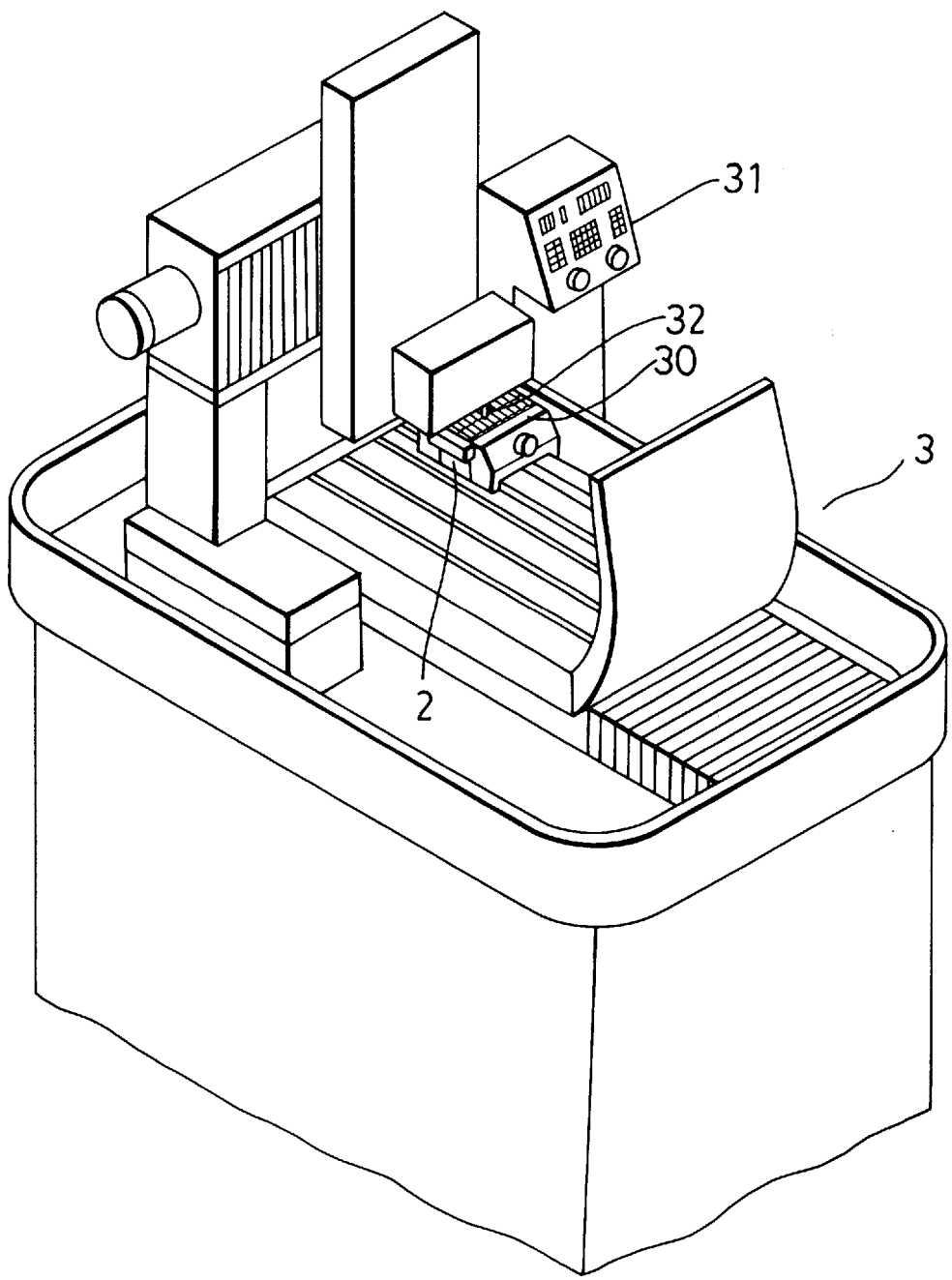
FIG. 4 is a perspective view showing a CNC (computer numerical control) drilling machine in the present invention.

2. Drilling holes:

The objects are positioned in rows in a vice 2 as shown in FIG. 3. The vice 2 has a plurality of recesses 20 for placing objects 10 therein, and is placed on a table 30 of a CNC drilling machine 3, as shown in FIG. 4. Then the vice 2 with objects 10 is pinched firmly on the table 30 for drilling holes in the objects 10. The data of hole locations is fed in a computer of the CNC drilling machine, and the drill 32 with the same shape as the cone shape of a diamond 11 is used to drill the cone-shaped holes 100 in the objects 10 placed on table 30, as shown in FIG. 2B.

Figure 5:
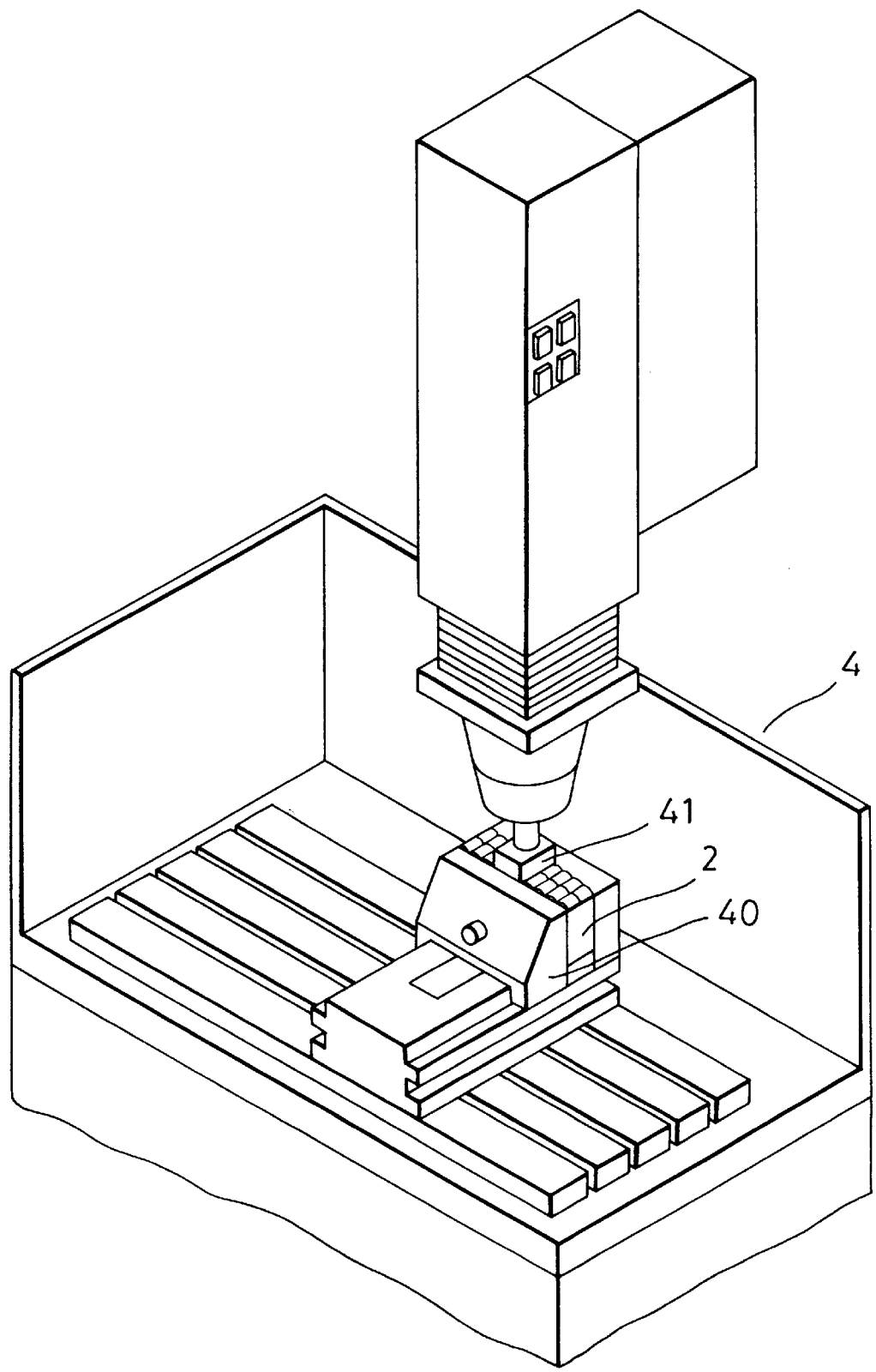
FIG. 5 is a perspective view showing an electrolysis processing machine in the present invention.
Figure 6:
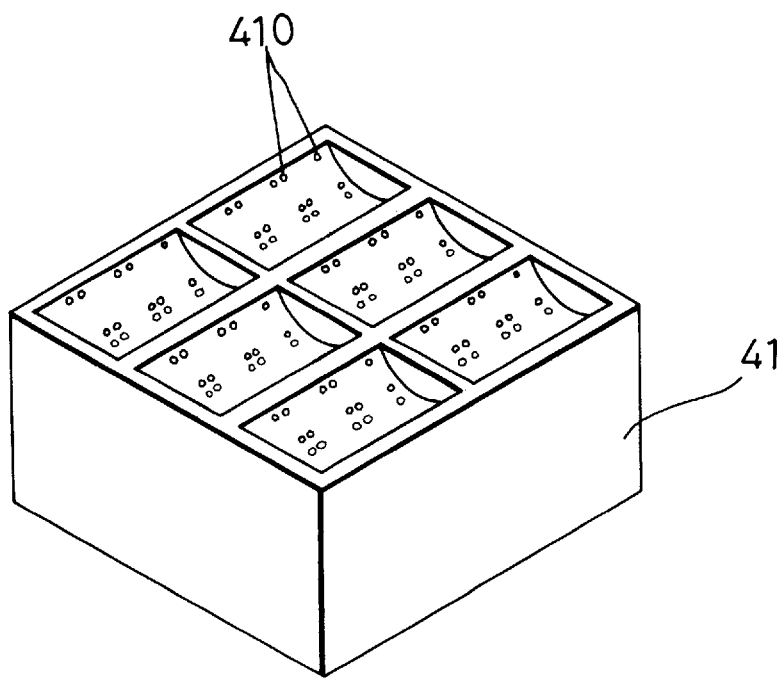
FIG. 6 is a perspective view of an electric pole mold in the present invention.

3. Electric etching:

The objects 10 drilled with cone-shaped holes 100 held in the vice 2 are then removed from the CNC drilling machine and brought to an electric processing machine 4 as shown in FIG. 5, placed and pinched firmly on the table 40. The electric processing machine 4 has an an electric pole mold 41 made of copper shown in FIG. 6, and provided with a plurality of curved recesses formed by a CNC processing machine. Each curved recess has four recessed holes 410 to correspond to outer edges of the cone-shaped holes 100 of the objects 10. Then the objects 10 are etched with the electrolysis processing machine 4, formed with four small projections 101 on the the outer edges of the cone-shaped holes 100, as shown in FIG. 2C.

4. Surface grinding with electrolysis:

The objects 10 finished with the third step of etching are then processed with an electrolysis processing machine, with their surfaces being ground smooth by means of electrolysis grinding, as shown in FIG. 2D.

Figure 7:
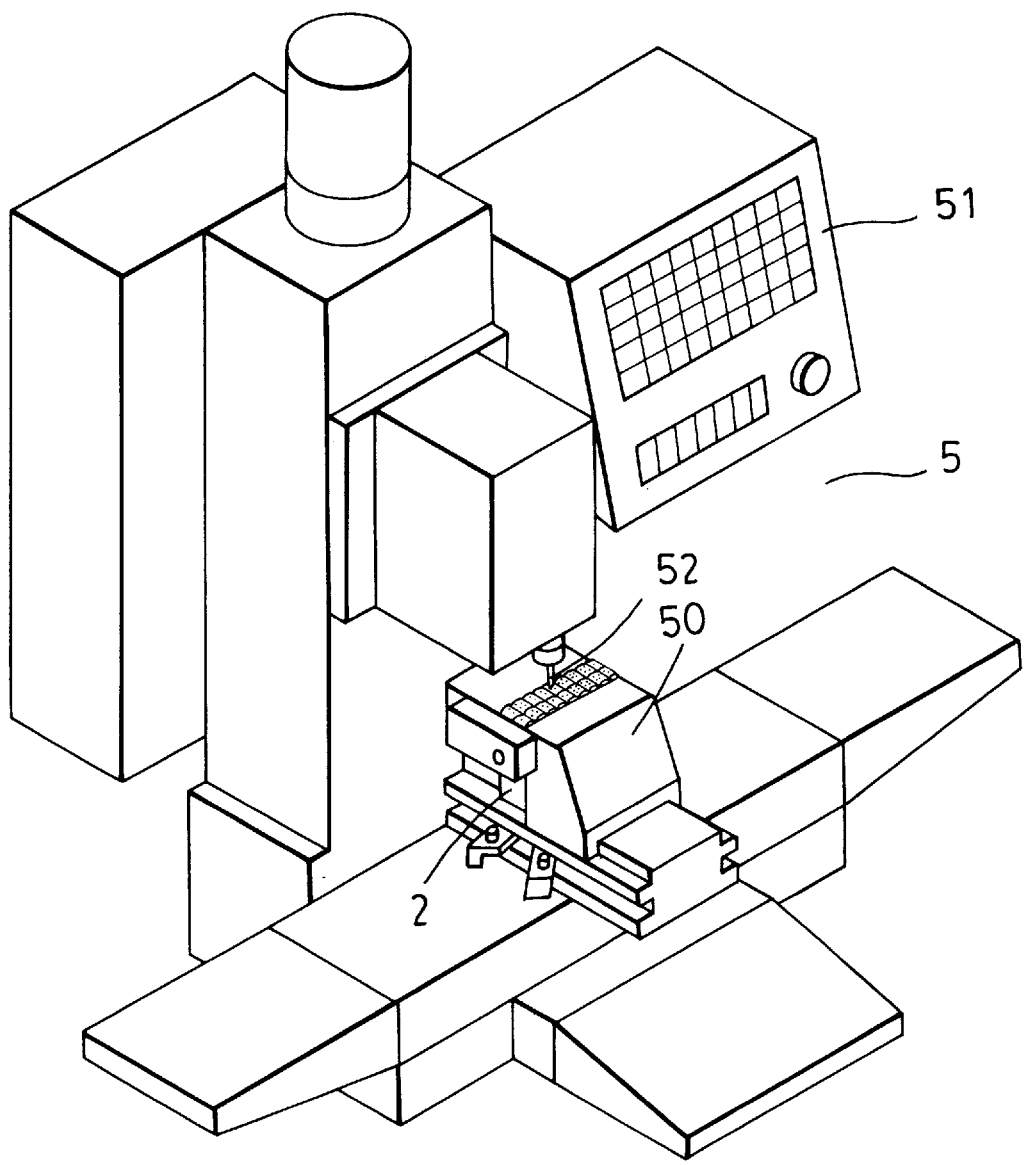
FIG. 7 is a perspective view showing a CNC diamond mounting machine in the present invention; and, FIGS. 8A and 8B are cross-sectional views showing a pressing rod pressing projections of an object on a sloped face of a diamond in the present invention.
Figure 8A:
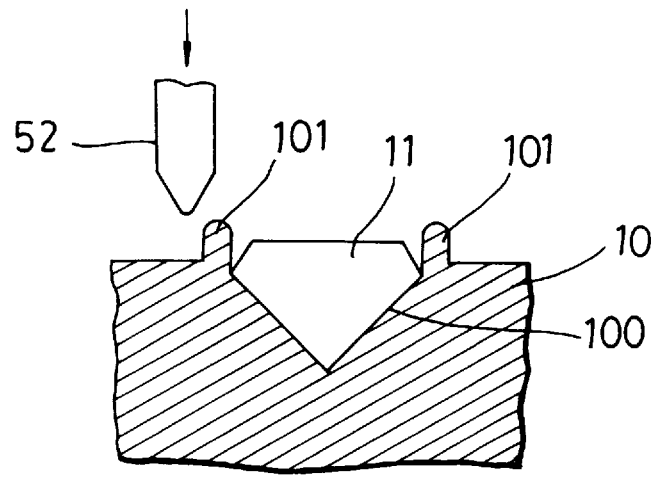
Figure 8B:
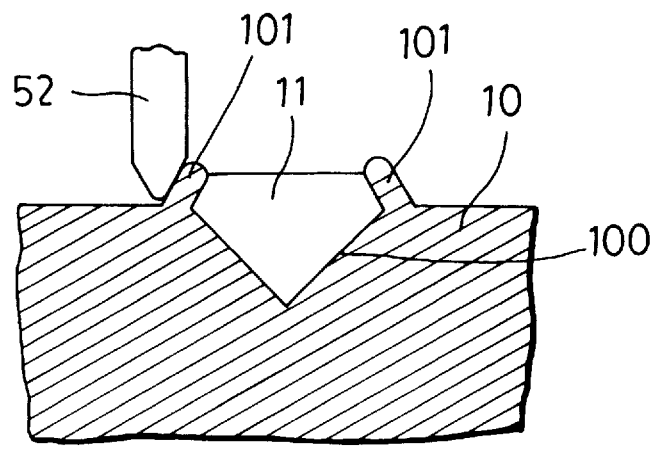

5. Mounting diamonds:

Diamonds 11 (or glass diamonds) are placed in the cone-shaped holes 100 one by one, and then the objects 10 with diamonds are mounted on and the vice 2 are placed on a table 50 of a CNC diamond mounting machine 5, as shown in FIG. 7, with data of moving locations of a press rod 52 fed in a computer 51 of the CNC diamond 2 mounting machine 5. The press rod 5 has a bottom shaped as a pointed cone with the same angle as that of a diamond as shown in FIG. 8. When the press rod 52 is pressed down, it forces a projection 101 at the outer edge of each cone-shaped hole 100 to bend onto a sloped face of a diamond 11, as shown in FIG. 8B, and thus the diamond 11 is locked in the hole 100 immovable, as shown in FIG. 2E.

6. Finished products:

Products or objects 11 mounted with diamonds, finished by passing through the steps described above can be combined with other components to become other products such as watch bands, watch housings, buckles, eyeglasses frames, brooches etc.

As described above, combination of the CNC processing machine with the electric processing machine can perform accurate drilling, and etching small projections 101 on objects 10 for mounting diamonds, thus facilitating processing more easily than traditional processes by means of manual work, and obtaining high economic gain.

The invention has the advantages as follows:

1. Lessening labor and time needed in conventional manual work of mounting diamonds in stainless steel objects by using CNC processing machine and an electric processing machine, and in addition, work can be accomplished more accurately and effectively.

2. Economic gain can be obtained by using electric processing machine for forming small projections on objects for mounting diamonds on objects made of stainless steel, instead of difficult manual work for processing stainless steel.

While the preferred embodiment of the invention has been described above, it will be recognized and understood that various modifications may be made therein and the appended claims are intended to cover all such modifications which may fall within the spirit and scope of the invention.

What is claimed is:

1. A method for mounting diamonds on stainless steel objects, comprising:

a first step of cutting material stainless steel into needed sizes and shapes;

a second step of drilling holes by arranging objects of stainless steel coming from said first step on a vice, and then said vice with said objects fixed thereon is pinched firmly on a table of a CNC drilling machine for drilling holes for diamonds;

a third step of etching small projections on said objects by placing said objects on an electric pole mold made of copper, said mold placed on a table of an electric processing machine and said objects on said mold being etched by said electric processing machine to form small projections on said objects;

a fourth step of grinding surfaces of said objects attached with said small projections by means of an electrolysis grinding machine; and a fifth step of mounting diamonds on said object finished with the fourth step by means of a CNC diamond mounting machine provided with a press rod for pressing said small projections to bend on a sloped face of a diamond so as to lock said diamond immovably in each said hole of each said object.

* * * * *